United States Patent [19]
Sklarchuk

[11] 3,791,896
[45] Feb. 12, 1974

[54] BI-FUNCTIONAL GAS ELECTRODE
[75] Inventor: Jack C. Sklarchuk, Trenton, N.J.
[73] Assignee: ESB Incorporated, Philadelphia, Pa.
[22] Filed: Dec. 16, 1971
[21] Appl. No.: 208,815

[52] U.S. Cl. .................... 136/86 D, 136/120 FC
[51] Int. Cl. .................. H01m 35/00, H01m 27/04
[58] Field of Search ............. 136/86 D, 86 A, 86 R, 136/120 FC; 252/447, 188; 117/226, 46 CG, 100 M

[56] References Cited
UNITED STATES PATENTS

| | | | |
|---|---|---|---|
| 3,123,567 | 3/1964 | Ruelle et al. | 252/447 |
| 3,432,355 | 3/1969 | Niedrach et al. | 136/86 D |
| 3,488,225 | 1/1970 | Selker et al. | 136/86 D |
| 3,522,103 | 7/1970 | White et al. | 136/120 FC |

Primary Examiner—A. B. Curtis
Assistant Examiner—H. A. Feeley

[57] ABSTRACT

A bi-functional gas electrode is described suitable for use in a rechargeable gas-metal cell or gas-metal oxide cell. A grid structure such as nickel screen is coated with carbonized nickel powder bonded in place by an organic polymer. The electrode is waterproofed by adhering a sheet of microporous polyfluorohydrocarbon on one of the surfaces of the electrode. The electrode is suitable for use with such gasses as oxygen, hydrogen carbon monoxide, and numerous carbon hydrogen compounds.

6 Claims, 5 Drawing Figures

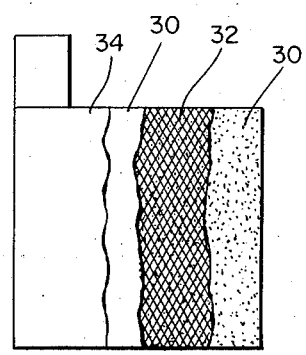
Fig. 2
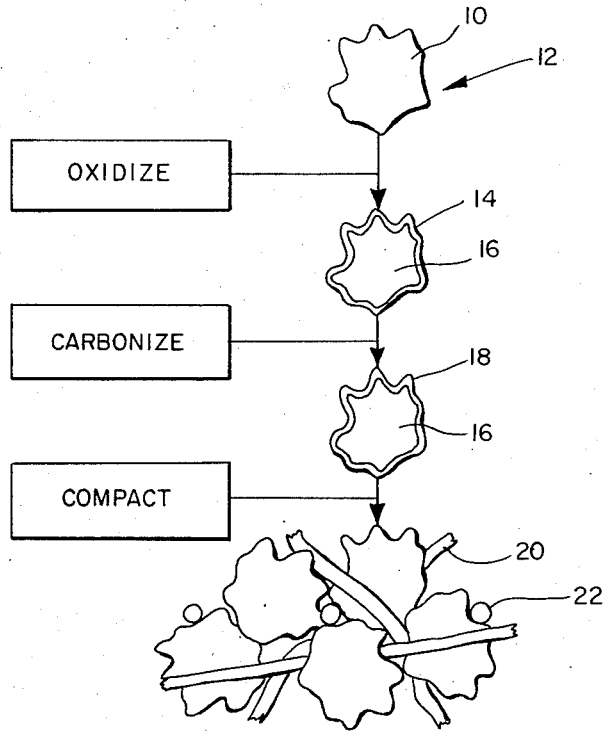
Fig. 1
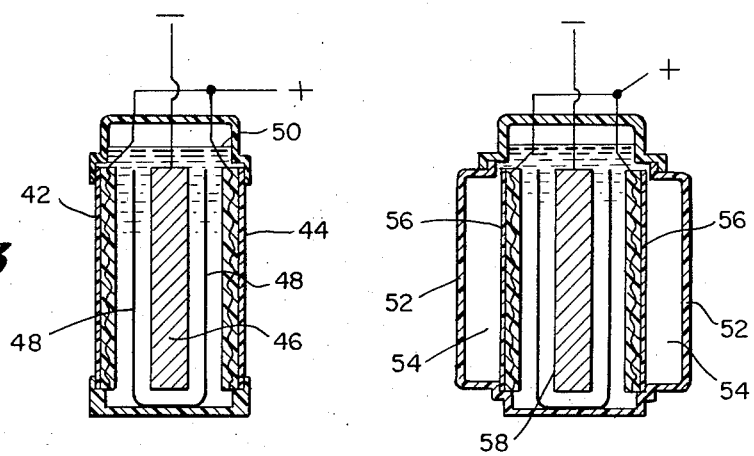
Fig. 3
Fig. 4
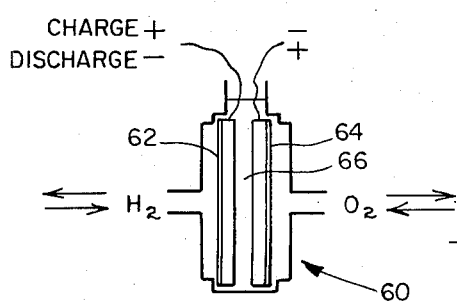
Fig. 5

BI-FUNCTIONAL GAS ELECTRODE

BACKGROUND OF THE INVENTION

1. Field of the Invention

This invention relates to electrochemical cells for storage and production of electrical energy. In particular, it relates to rechargeable hybrid fuel cells.

2. Description of the Prior Art

In the fuel cell art, true fuel and a fluid oxidant are reacted together to produce electric power. Hybrid fuel cells are also known in which a fluid fuel or a fluid oxidant is reacted with a solid oxidizable or reducible electrode. In the hybrid type cells, it may be desirable to regenerate the solid electrode after use just as a storage battery is regenerated or charged. A typical hybrid type cell is an air (oxidant) zinc (solid oxidizable material) cell. This cell can be discharged until practically all the zinc has been oxidized. For further use of the cell either new zinc must be added or the cell must be charged up to convert the oxidized zinc back to zinc metal. The classical air electrode for such a cell is made from a mixture of carbon powder often with a catalytic base metal powder such as nickel, and often with a noble metal such as platinum, bonded and waterproofed by a teflon matrix, with a metallic screen as a current collector. It has been found that when an electrode of such construction is anodized or used to recharge the zinc, it rapidly loses its ability to perform as an air electrode. The recharging process seems to have a deleterious effect on the electrode both on the ability of the electrode to catalyze the oxygen reaction and on the structural strength. Therefore, when rechargeable air-zinc cells are made, a third electrode is included in the construction. This third electrode may take the form of a metallic grid such as nickel screen interposed between the air electrode and the metallic electrode. The third electrode must be suitably insulated and switching means must be provided for connecting the electrode when the cell is to be charged. The space required by the electrode and its separation along with the added complexity of the electrical circuit has curtailed the use of the rechargeable air-zinc cell. A truly anodizable air electrode would simplify and extend the use of this system. It should be pointed out that the zinc-air cell can provide two or more times the power per unit weight when compared to conventional storage batteries. A reliable long life air-zinc cell development would make possible an electric car competitive with present internal combustion driven cars. Work is being done to solve the problem of the anodizable air electrode. However, progress up till recently has not be outstanding.

SUMMARY OF THE INVENTION

An anodizable air electrode requiring no costly materials comprises a metal powder bound to a metallic grid by an organic polymer binder. The surface of the metallic powder is carbonized or so treated as to have an extremely thin layer of carbon, structurally bound thereto. One surface of the electrode is rendered nonwetting so as to prevent the electrolyte from penetrating and closing the pores of the electrode. The nonwetting feature is obtained by adhering a microporous film of polyfluorohydrocarbon thereto. Suitable metals for the electrode powder are nickel, cobalt and iron. It is seen that the component materials from which the electrode is made are not high in cost. The method of making the electrodes lends itself to automation and low manufacturing cost. The electrode is not damaged in any way by the anodizing process. Thus, it is an ideal electrode for use in rechargeable air zinc cells. It has also been found that the electrode will perform as a hydrogen or other fuel electrode thus extending its application to fuel-metal oxide rechargeable cells. The electrode has one limitation. It is not suitable for use in strongly acid electrolytes and must be used only with neutral, basic or strongly basic electrolyte solution.

BRIEF DESCRIPTION OF THE DRAWINGS

FIG. 1 shows in block form the steps used to prepare the active powder of the invention. It also shows a stylized diagram of the material as it is processed;

FIG. 2 shows a typical electrode made in accordance with the invention;

FIG. 3 shows a metal air cell of the invention in cross section;

FIG. 4 shows a fuel metal oxide cell of the invention in cross section, and

FIG. 5 shows in cross section a rechargeable hydrogen-oxygen fuel cell.

DESCRIPTION OF THE PREFERRED EMBODIMENT

In FIG. 1, the surface 10 a particle of a base metal powder 12 such as nickel, cobalt or iron is oxidized by heating the powder in air. The oxidation is carefully controlled so as to produce a thin oxide layer 14 only and leaving a substrate 16 of metal in the body of the particle. The oxide layer may be only molecules thick although thicker layers up to microns thick may be used depending upon the size of the particle. The hot oxidized powder is then exposed to a hydrocarbon gas such as methane. A reaction then occurs known as "carbonizing". The oxygen atoms of the metal oxide are replaced by carbon atoms to give a very adherent uniform and thin coating 18 of carbon on the metal base.

It is believed that the first layer of carbon atoms at the surface of the metal actually enter into the crystal lattice and that a lattice of reduced carbon atoms and metal atoms then build up above the metal surface to give the adherent coating referred to above. The thickness of the carbon layer will be of the order of the original metal oxide layer. If it is much thicker than a few microns the layer loses its adherence to the underlying metal. This "carbonizing" process has been used in the radio tube industry for coating the plates of vacuum tubes for good heat radiation.

The carbonized metal powder is then mixed with an organic polymer binder material 20 such as polystyrene, polyethylene, polypropylene or any of the polyfluorohydrocarbons such as Teflon, Kel-F, etc. This mixture is spread on a metal grid 22 and bonded thereto by the binder material, to form a supported catylist sheet.

It is well known in the art that when catalytic powders of the type described are bound to a metallic grid by an organic binder, the catalytic powder particles will be found to be in electronic contact with themselves and with the metallic grid, even when surrounded by an electrolyte. This will be found even with comparatively high percentages of organic binder and almost regardless of the type of organic binder chosen.

The cut-away plate shown in FIG. 2 illustrates at 30 the carbonized metal-binder matrix formed around the grid 32 of expanded metal. To complete the electrode, a sheet of microporous polyfluorohydrocarbon 34 is attached to the top surface of the catalyst sheet.

A complete cell 40 is shown in cross section in FIG. 3. A first air electrode 42 forms one wall of the cell and a second air electrode 44 forms the other wall. A metal anode 46 is placed between the air electrodes and separated therefrom by a separator 48. Electrolyte 50 fills the cell to a point above the top of the metal anode 46. Note that the side of the air electrodes 42 and 44 having the layer of porous Teflon thereupon faces the gas.

The metallic anode 46 may be made of zinc (either solid or porous), cadmium sponge, iron sponge or aluminum, magnesium or other metal. The choice of anode depends upon the desired cell characteristic. Soluble anodes such as zinc and magnesium give high cell voltages but require membrane type separators and tend to have short cycle life. Insoluble type electrodes such as iron and cadmium give very long cycle life, require only a felted type separator, but have lower operating voltages.

A cell, FIG. 4, similar to that of FIG. 3 may be used as a fuel-oxidizer metal cell. In order to conserve the fuel, the fuel electrodes are enclosed as shown by the walls 52. A fuel gas such as hydrogen or methane is fed into the gas chambers 54 formed by the walls 52 and the fuel anodes 56. The cathode 58 is a metallic oxide such as nickel oxyhydroxide, silver oxide, mercuric oxide or other metallic oxide operable in an alkaline electrolyte solution.

There is a class of hydrogen-oxygen fuel cell which is used reversably. When fed with hydrogen and oxygen, it produces electricity and water. When it is charged, water is electrolyzed to produce hydrogen and oxygen. The gas is stored for later reuse in the cell. The electrodes of the invention are ideally suited to this service as they give a reasonable voltage and will withstand repeated cycles of charge and discharge.

FIG. 5 shows a cell 60 comprising two gas electrodes 62 and 64 made in accordance with the invention with an electrolyte 66 such as potassium hydroxide solution between. Electrode 62 may be fed with hydrogen and electrode 64 with oxygen, forming a fuel cell. When a reverse current is applied to the cell, hydrogen is evolved from electrode 62 and oxygen from electrode 64.

It has been found that when conventional gas electrodes making use of carbon in an alkaline electrolyte solution are cathodized (used as charging electrodes against a metallic negative electrode), the structure of the carbon breaks down and the electrode falls apart or the carbon breaks away from itself. However, in the case of the electrode of the invention, because the carbon layer on each metallic particle is only one or at the most a comparatively few molecules thick, it is bound tightly enough to the substrate metal to prevent such attack. Electrodes of the invention may be charged for many cycles or over a period of many hours without appreciable loss in operating characteristics. Examples of the invention are:

EXAMPLE I

Fifty grams of nickel powder was placed in a muffle furnace. It was heated for one hour at 654°C. The oxidized powder was then placed in a retort filled with methane ($CH_4$) and heated to 816°C. The temperature was held at 816°C for one-half hour. The retort was then evacuated and the temperature raised to 927°C for 15 minutes to remove all absorbed gasses. The carbonized powder was slurried with 100 ccs water. To this was added sufficient emulsion of polytetrafluoromethane (teflon) to give 10 percent teflon to the slurried carbonized metal powder. The mixture was heated to 70° and stirred until all the Teflon came down on the powder. The Teflonated powder was settled out and washed. It was then spread on a grid of expanded metal. A sheet of microporous Teflon was laid on top. The sandwich so prepared was placed on platens at a temperature of 204°C and pressed at 3000 PSI for one minute. After drying, the electrode was tested.

EXAMPLE II

Electrodes similar to those made according to Example I were prepared having 20 and 30 percent Teflon. These gas electrodes were tested as air electrodes and showed performance as follows:

| Current $Ma/cm^2$ | Percent Teflon Volts vs $H_2/H+$ 10% | 20% | 30% |
| --- | --- | --- | --- |
| 0 | 0.990 | 0.996 | 1.019 |
| 10 | 0.821 | 0.813 | 0.796 |
| 20 | 0.790 | 0.785 | 0.741 |
| 30 | 0.762 | 0.755 | 0.677 |
| 50 | 0.703 | 0.681 | 0.533 |
| 75 | 0.624 | 0.578 | 0.348 |
| 100 | 0.539 | 0.457 | 0.348 |
| 150 | 0.366 | 0.199 | rev. |

EXAMPLE III

Electrodes were prepared similar to those made according to example I, using powder carbonized at several temperatures from 760° to 927°C. When tested as air electrodes they gave results as follows:

| $Ma/cm^2$ | Current Density 760°C | 816°C | 871°C | 927°C |
| --- | --- | --- | --- | --- |
| 0 | 0.955 | 0.947 | 1.020 | 1.021 |
| 10 | 0.800 | 0.796 | 0.773 | 0.773 |
| 20 | 0.768 | 0.775 | 0.749 | 0.742 |
| 30 | 0.742 | 0.752 | 0.724 | 0.709 |
| 50 | 0.691 | 0.709 | 0.665 | 0.631 |
| 75 | 0.624 | 0.631 | 0.572 | 0.514 |
| 100 | 0.540 | 0.568 | 0.472 | 0.408 |
| 150 | 0.365 | 0.371 | 0.287 | 0.235 |

EXAMPLE IV

An electrode similar to those of Example I was cycled according to the following schedule:
Charge 15 /$ma/cm^2$ for 16 hours
Discharge 30 $ma/cm^2$ for 8 hours
The electrode performance for 100 cycles was:

| No. of Cycles | Volts vs $H_2/H+$ at 30 $ma/cm^2$ |
| --- | --- |
| 1 | 0.700 |
| 2 | 0.705 |

-Continued

| No. of Cycles | Volts vs $H_2/H+$ at 30 ma/cm$^2$ |
|---|---|
| 3 | 0.707 |
| 4 | 0.710 |
| 5 | 0.715 |
| 10 | 0.715 |
| 15 | 0.712 |
| 20 | 0.709 |
| 30 | 0.690 |
| 50 | 0.630 |
| 75 | 0.600 |
| 100 | 0.500 |

Having fully described my invention and given examples of its embodiment, I hereby claim:

1. A gas electrode for use in electrochemical cells suitable for both charge and discharge which comprises:
   a. a metallic grid;
   b. a first sheet comprising particles of polytetrafluoro-ethylene binder and particles of base metal catalyst, the base metal of the catalyst selected from the group which consists of cobalt, iron and nickel, the surface of each particle of the base metal catalyst being coated with a coating of carbon, the carbon coating being atomically bound to the surface of the metal particles, a first side of the first sheet being bound to the metallic grid by adhesion of the binder; and
   a second sheet attached to a second surface of the first sheet,
   the second sheet comprising microporous polyfluorohydrocarbon.

2. A gas electrode as defined in claim 1 wherein the ratio of binder to the catalyst of the first sheet is about one to three parts by weight of binder to about 10 parts by weight of catalyst.

3. A gas electrode as defined in claim 1 wherein the base metal of the catalyst is nickel.

4. An electrochemical cell for the storage and delivery of electrical power which comprises:
   a. a container with an electrolyte therein;
   b. a metallic negative electrode located within the container;
   c. a reversible oxygen gas positive electrode comprising:
      a metallic grid,
      a first sheet comprising particles of polytetrafluoroethylene binder and a base metal catalyst, the base metal of the catalyst being selected from the group which consists of cobalt, iron and nickel, the surface of each particle of the base metal being coated with a coating of carbon, the carbon coating being atomically bound to the surface of the metal particles, a first side of the first sheet being bound to the metallic grid by adhesion of the binder; and a second sheet having a first surface attached to a second surface of the first sheet the second sheet comprising microporous polyfluorohydrocarbon, a second surface of the second sheet being in contact with the electrolyte and the first side of the first sheet being exposed to a source of oxygen.

5. An electrochemical cell as defined in claim 4 wherein the ratio of binder to catalyst of the first sheet is about one to three parts by weight of binder to about 10 parts by weight of catalysts.

6. An electrochemical cell as defined in claim 4 wherein the base metal of the catalyst is nickel.

* * * * *